(12) United States Patent
Komatsu et al.

(10) Patent No.: US 12,110,005 B2
(45) Date of Patent: Oct. 8, 2024

(54) CONTROL DEVICE FOR HYBRID VEHICLE

(71) Applicant: TOYOTA JIDOSHA KABUSHIKI KAISHA, Aichi-ken (JP)

(72) Inventors: Takehiro Komatsu, Toyota (JP); Masahiro Kachi, Nagakute (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 207 days.

(21) Appl. No.: 17/985,883

(22) Filed: Nov. 13, 2022

(65) Prior Publication Data

US 2023/0249669 A1    Aug. 10, 2023

(30) Foreign Application Priority Data

Feb. 8, 2022  (JP) ................................ 2022-017924

(51) Int. Cl.
| | |
|---|---|
| *B60W 20/40* | (2016.01) |
| *B60W 10/02* | (2006.01) |
| *B60W 10/06* | (2006.01) |
| *B60W 40/10* | (2012.01) |
| *B60W 40/105* | (2012.01) |

(52) U.S. Cl.
CPC ............ *B60W 20/40* (2013.01); *B60W 10/02* (2013.01); *B60W 10/06* (2013.01); *B60W 40/105* (2013.01); *B60W 2510/0638* (2013.01)

(58) Field of Classification Search
CPC ...... B60K 2006/268; B60K 2006/4825; B60K 6/26; B60K 6/48; B60W 10/02; B60W 10/06; B60W 10/08; B60W 20/40; B60W 2510/0638; B60W 2520/10; B60W 40/105; Y02T 10/62
See application file for complete search history.

(56) References Cited

U.S. PATENT DOCUMENTS

| | | | | |
|---|---|---|---|---|
| 9,821,798 | B2 * | 11/2017 | Wang | B60W 10/08 |
| 2015/0226171 | A1 * | 8/2015 | Kees | B60K 6/485 |
| | | | | 290/31 |
| 2019/0210587 | A1 * | 7/2019 | Nishida | B60W 10/08 |
| 2019/0217852 | A1 * | 7/2019 | Komoda | B60W 10/06 |

FOREIGN PATENT DOCUMENTS

JP          2020111276 A        7/2020

* cited by examiner

*Primary Examiner* — Tyler J Lee
(74) *Attorney, Agent, or Firm* — HAUPTMAN HAM, LLP

(57) ABSTRACT

A control device for a hybrid vehicle that includes an internal combustion engine, a motor, and a clutch provided between the internal combustion engine and the motor includes a first start control unit that starts the internal combustion engine by causing the motor to perform cranking, a second start control unit that starts the internal combustion engine without causing the motor to perform cranking, and a setting unit that sets a threshold for a rotational speed of the internal combustion engine according to a vehicle speed of the hybrid vehicle. When the rotational speed of the internal combustion engine is less than the threshold, the first start control unit starts the internal combustion engine. When the rotational speed of the internal combustion engine is equal to or higher than the threshold, the second start control unit starts the internal combustion engine.

2 Claims, 3 Drawing Sheets

CONTROL DEVICE FOR HYBRID VEHICLE

CROSS-REFERENCE TO RELATED APPLICATION

This application claims priority to Japanese Patent Application No. 2022-017924 filed on Feb. 8, 2022, incorporated herein by reference in its entirety.

BACKGROUND

1. Technical Field

The present disclosure relates to a control device for a hybrid vehicle.

2. Description of Related Art

Some hybrid vehicles are equipped with an internal combustion engine (engine), a motor in a power transmission path between the engine and a wheel, and a clutch in the power transmission path between the engine and the motor. When an engine start request is made, the clutch is slipped, and the engine is cranked by the motor, and then the clutch is engaged and the engine is started (for example, Japanese Unexamined Patent Application Publication No. 2020-111276 (JP 2020-111276 A)).

SUMMARY

As described above, an internal combustion engine may be started by performing cranking. The internal combustion engine may be started by supplying and burning fuel without cranking. For combustion, air is introduced into the internal combustion engine. However, before the introduction of air, there is a possibility that the rotational speed of the internal combustion engine decreases, and the engine will stall (engine stall). Therefore, the present disclosure provides a control device for a hybrid vehicle that can prevent engine stall and start an internal combustion engine.

An aspect of the present disclosure is a control device for a hybrid vehicle that includes an internal combustion engine, a motor, and a clutch provided between the internal combustion engine and the motor. The control device includes a first start control unit configured to start the internal combustion engine by causing the motor to perform cranking, a second start control unit configured to start the internal combustion engine without causing the motor to perform cranking, and a setting unit configured to set a threshold for a rotational speed of the internal combustion engine according to a vehicle speed of the hybrid vehicle. The first start control unit is configured to start the internal combustion engine when the rotational speed of the internal combustion engine is less than the threshold. The second start control unit is configured to start the internal combustion engine when the rotational speed of the internal combustion engine is equal to or higher than the threshold.

In the aspect, the control device may include a throttle control unit configured to control a throttle valve of the internal combustion engine. The throttle control unit may open the throttle valve when the vehicle speed of the hybrid vehicle is equal to or higher than a predetermined speed. The setting unit may set the threshold to a first value when the vehicle speed of the hybrid vehicle is equal to or higher than the predetermined speed. The setting unit may set the threshold to a second value larger than the first value when the vehicle speed of the hybrid vehicle is less than the predetermined speed.

It is possible to provide a control device for a hybrid vehicle capable of preventing engine stall and starting an internal combustion engine.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hybrid Vehicle

Figure 1:
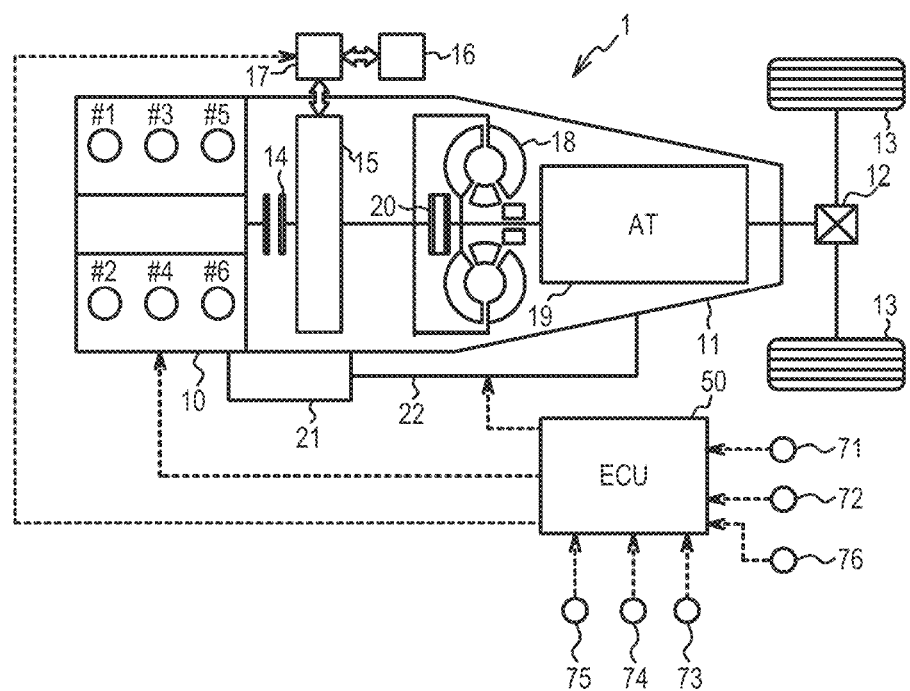
FIG. 1 is a schematic diagram illustrating a hybrid vehicle.

FIG. 1 is a schematic diagram illustrating a hybrid vehicle 1. The hybrid vehicle 1 is equipped with an engine 10 (internal combustion engine) and a motor 15 as drive sources. The hybrid vehicle 1 is provided with a K0 clutch 14, the motor 15, a torque converter 18, and an automatic transmission 19 in that order along a power transmission path from the engine 10 to wheels 13. The engine 10 may be, for example, a V6 engine, that has six cylinders #1 to #6. The engine 10 may be, for example, a V engine or a straight engine. The engine 10 may be a gasoline engine or a diesel engine. The number of cylinders of the engine 10 may be plural, for example, four or six, or may be one. The K0 clutch 14, the motor 15, the torque converter 18, and the automatic transmission 19 are provided in a transmission unit 11. The transmission unit 11 and the left and right wheels 13 are drive-connected via a differential gear 12.

The K0 clutch 14 is provided between the engine 10 and the motor 15 on the same power transmission path. The state of the K0 clutch 14 is switched to one of a released state, a slip state, and an engaged state according to the supply of hydraulic pressure. Specifically, when the K0 clutch 14 is in the released state, the hydraulic pressure supply causes it to be in the slip state or the engaged state, and the power transmission between the engine 10 and the motor 15 is connected. Further, the K0 clutch 14 is switched to the released state when the hydraulic pressure supply is stopped, and cuts off the power transmission between the engine 10 and the motor 15. The slip state is a state in which an engaging element on the engine 10 side of the K0 clutch 14 and an engaging element on the motor 15 side are in sliding contact with each other with a predetermined rotational speed difference. The engaged state is a state in which both engaging elements of the K0 clutch 14 are connected and the engine 10 and the motor 15 have the same rotational speed. The released state is a state in which both engaging elements of the K0 clutch 14 are separated from each other.

The motor 15 is connected to a battery 16 via an inverter 17. The motor 15 functions as a motor that generates a driving force for the vehicle in response to electric power supplied from the battery 16, and also functions as a generator that generates electric power that charges the battery 16 in response to power transmission from the engine 10 and the wheel 13. The electric power transferred between the motor 15 and the battery 16 is adjusted by the inverter 17.

The inverter 17 is controlled by the ECU 50 described below, and either converts a direct voltage from the battery 16 into an alternating voltage, or converts an alternating voltage from the motor 15 into a direct voltage. In the case of a power running operation in which the motor 15 outputs torque, the inverter 17 converts the direct voltage of the battery 16 into the alternating voltage to adjust the electric power supplied to the motor 15. In the case of a regenerative operation in which the motor 15 generates electric power, the inverter 17 converts the alternating voltage from the motor 15 into the direct voltage to adjust the electric power supplied to the battery 16.

The torque converter 18 is a fluid joint having a torque amplification function. The automatic transmission 19 is a stepped automatic transmission that switches the gear ratio in multiple stages by switching gear stages. The automatic transmission 19 is provided between the motor 15 and the wheel 13 on the power transmission path. The motor 15 and the automatic transmission 19 are connected via the torque converter 18. The torque converter 18 is provided with a lockup clutch 20 that receives hydraulic pressure and is in an engaged state to directly connect the motor 15 and the automatic transmission 19.

The transmission unit 11 is further provided with an oil pump 21 and a hydraulic pressure control mechanism 22. The hydraulic pressure generated by the oil pump 21 is supplied to the K0 clutch 14, the torque converter 18, the automatic transmission 19, and the lockup clutch 20, respectively, via the hydraulic pressure control mechanism 22. The hydraulic pressure control mechanism 22 is provided with hydraulic circuits for each of the K0 clutch 14, the torque converter 18, the automatic transmission 19, and the lockup clutch 20, and various hydraulic control valves for controlling their hydraulic pressure.

The hybrid vehicle 1 is provided with an electronic control unit (ECU) 50 as a control device. The ECU 50 is an electronic control unit including an arithmetic processing circuit that performs various arithmetic processing related to vehicle travel control, and a memory in which programs and data for the control are stored. The ECU 50 is an example of a control device for a hybrid vehicle. The ECU 50 functions as a first start control unit and a second start control unit for starting the engine 10, a setting unit for setting a threshold for the rotational speed of the engine 10, and a throttle control unit for controlling the opening degree of a throttle valve 40.

The ECU 50 controls the drive of the engine 10 and the motor 15. For example, the ECU 50 controls the torque and the rotational speed of the engine 10 by controlling the throttle opening, the ignition time, and the fuel injection amount of the engine 10. Further, the ECU 50 controls the drive of the K0 clutch 14, the lockup clutch 20, and the automatic transmission 19 through the control of the hydraulic pressure control mechanism 22. The ECU 50 controls the hydraulic pressure applied to the K0 clutch 14 by using the hydraulic pressure control mechanism 22, and changes the state of the K0 clutch 14 to control the cranking torque transmitted from the motor 15 to the engine 10.

The ECU 50 controls the rotational speed and torque of the motor 15 by controlling the inverter 17 to adjust the amount of electric power exchanged between the motor 15 and the battery 16. Further, as will be described in detail below, the ECU 50 controls the electric power supplied from the motor 15 to the battery 16 by the inverter 17 such that the motor braking torque in the regenerative operation becomes a target value.

Signals from an ignition switch 71, a crank angle sensor 72, a motor rotational speed sensor 73, an air flow meter 74, an accelerator opening sensor 75, and a vehicle speed sensor 76 are input to the ECU 50. The crank angle sensor 72 detects the rotational speed of a crank shaft 33 of the engine 10. The motor rotational speed sensor 73 detects the rotational speed of an output shaft of the motor 15. The air flow meter 74 detects the intake air amount of the engine 10. The accelerator opening sensor 75 detects the opening degree of the accelerator pedal, which is the amount by which a driver presses the accelerator pedal. The vehicle speed sensor 76 detects the speed (vehicle speed) of the hybrid vehicle 1.

The ECU 50 drives the hybrid vehicle in either a motor mode or a hybrid mode. In the motor mode, the ECU 50 releases the K0 clutch 14 and drives the hybrid vehicle by the power of the motor 15. In the hybrid mode, the ECU 50 engages the K0 clutch 14 and drives the hybrid vehicle at least by the power of the engine 10. The hybrid mode includes a mode in which the hybrid vehicle travels using only the power of the engine 10, and a mode in which the motor 15 is driven by power running and the hybrid vehicle travels using both the engine 10 and the motor 15 as power sources.

The switching of the traveling mode is performed based on the required driving force of the vehicle obtained from the vehicle speed and the opening degree of the accelerator, the charging state of the battery 16, and the like. For example, when the required driving force is relatively small and the state of charge (SOC) indicating the remaining charge of the battery 16 is relatively high, the motor mode in which the engine 10 stops is selected in order to improve fuel efficiency. When the required driving force is relatively large or the SOC of battery 16 is relatively low, the hybrid mode in which at least the engine 10 is driven is selected.

In the hybrid mode, the ECU 50 executes intermittent operation control for automatically stopping the engine 10 when a predetermined stop condition is satisfied and restarting the automatically stopped engine 10 when a predetermined restart condition is satisfied. For example, when the accelerator opening degree becomes zero in the hybrid mode, the ECU 50 automatically stops the engine 10 assuming that an automatic stop condition is satisfied. Further, when the accelerator opening degree becomes larger than zero, the ECU 50 automatically restarts the engine 10 assuming that a restart condition is satisfied. When the engine 10 is automatically stopped, the ECU 50 releases the K0 clutch 14 to stop the fuel injection. When the engine 10 is automatically restarted, the ECU 50 cranks the engine 10 by the motor 15 via the K0 clutch 14 to start fuel injection and ignition, and then engages the K0 clutch 14. Further, the ECU 50 can also start the engine 10 without performing cranking. Fuel is supplied into the cylinder of the engine 10 and the mixture of fuel and air is burned to start the engine 10.

During inertial rotation after the combustion of the engine 10 is stopped, the ECU 50 temporarily increases the opening degree of the throttle valve 40 and then decreases the opening degree (stop position control). Air is introduced into the cylinder by opening the throttle valve 40 during inertial rotation. By increasing the compression torque, the stop position of the engine 10 is set to a desired position. The stop position control can reduce the cranking torque required for the motor 15 when the engine 10 is restarted.

Engine

Figure 2:
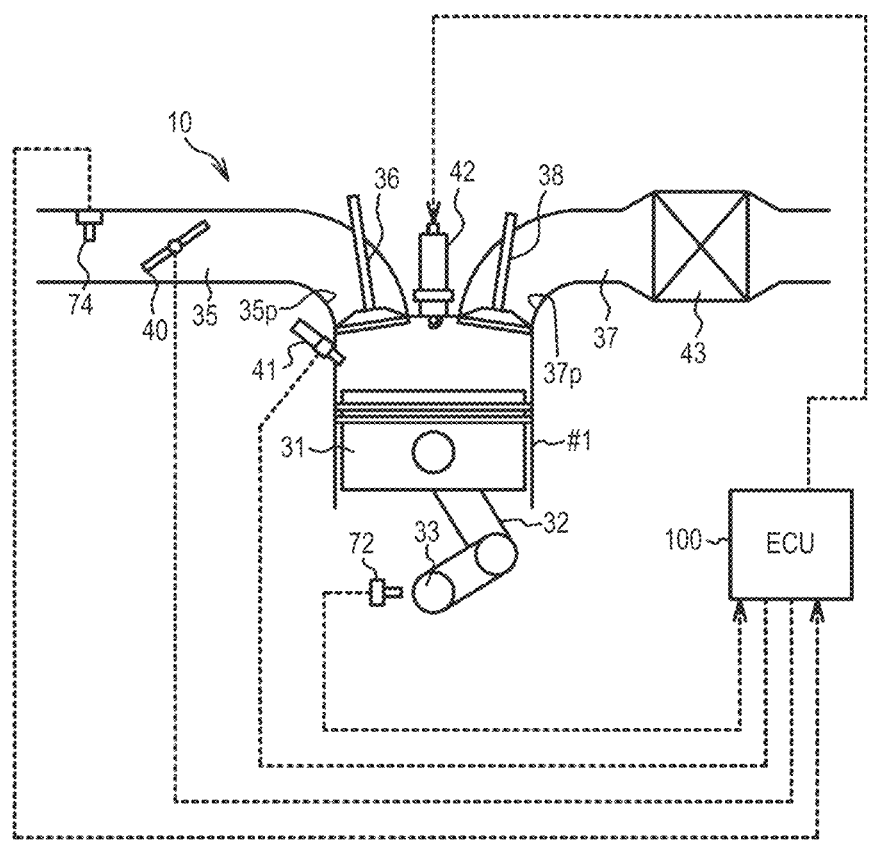
FIG. 2 is a schematic configuration diagram of an engine.

FIG. 2 is a schematic configuration diagram of the engine 10, and illustrates one cylinder #1 of a plurality of cylinders of the engine 10. The engine 10 has a piston 31, a connecting rod 32, the crank shaft 33, an intake passage 35, an intake valve 36, an exhaust passage 37, and an exhaust valve 38. The air-fuel mixture is burned inside the cylinder. The piston 31 is accommodated in the cylinder #1 so as to be reciprocating, and is connected to the crank shaft 33, which is the output shaft of the engine 10, via the connecting rod 32. The connecting rod 32 and the crank shaft 33 convert the reciprocating motion of the piston 31 into the rotational motion of the crank shaft 33.

The intake passage 35 is connected to an intake port 35p of the cylinder #1 via the intake valve 36. The exhaust passage 37 is connected to an exhaust port 37p of the cylinder #1 via the exhaust valve 38. The intake passage 35 is provided with the above-described air flow meter 74 and the throttle valve 40 for adjusting the intake air amount. The exhaust passage 37 is provided with a catalyst 43 for purifying the exhaust gas.

The cylinder #1 is provided with an in-cylinder injection valve 41. The in-cylinder injection valve 41 injects fuel directly into the cylinder #1. In addition to the in-cylinder injection valve 41, or in place of the in-cylinder injection valve 41, a port injection valve that injects fuel toward the intake port may be provided. The cylinder #1 is provided with an ignition device 42 that ignites a mixture of intake air introduced through the intake passage 35 and fuel injected by the in-cylinder injection valve 41 by spark discharge. The other cylinders of the engine 10 have a similar configuration.

The ECU 50 starts the engine 10 with cranking or starts the engine 10 without cranking. When no cranking is performed, the engine 10 is started by supplying fuel to the engine 10 and burning the fuel. In order to burn fuel, it is important that air is introduced into the cylinder. It takes time to introduce air after the stop of the engine 10. The rotational speed continues to decrease even during the introduction of air.

When the engine is requested to start, if the rotational speed is low, the engine 10 may stall due to the decrease in the rotational speed. In order to prevent the engine stall, cranking is performed and the engine 10 is started. On the other hand, when the rotational speed is high, the time until the engine 10 stalls becomes long. Air can be introduced at this time and the engine 10 can be started without cranking.

Figure 3:
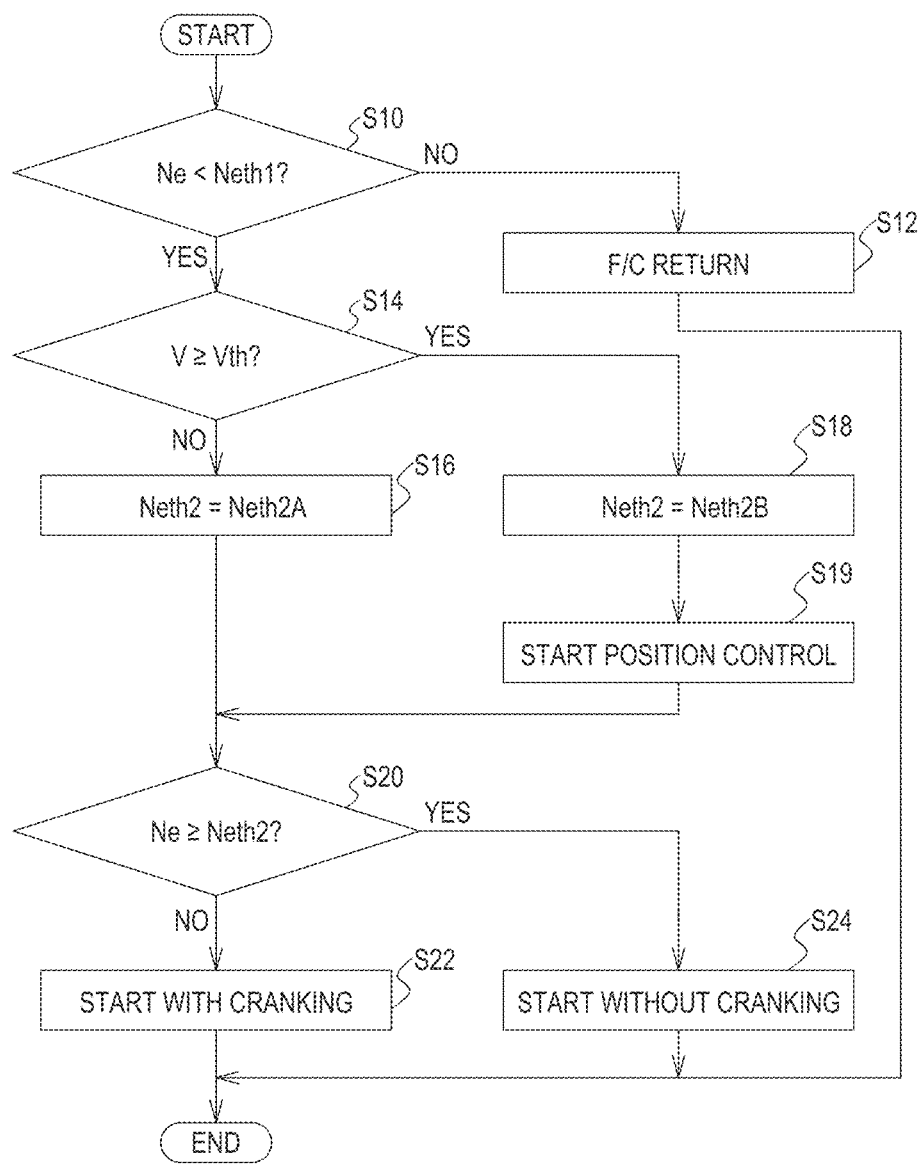
FIG. 3 is a flowchart illustrating a process executed by an ECU.

FIG. 3 is a flowchart illustrating a process executed by the ECU 50. The engine 10 is in a fuel cut (F/C) state. The ECU 50 determines whether a rotational speed Ne of the engine 10 is less than a predetermined value Neth1 (step S10). In the case of a negative determination (No), the ECU 50 returns the engine 10 from the fuel cut (F/C return, step S12). After step S12, the process ends.

In the case of an affirmative determination (Yes) in step S10, the ECU 50 determines whether a vehicle speed V of the hybrid vehicle 1 is equal to or greater than a predetermined value Vth (step S14). In the case of a negative determination, the ECU 50 sets a threshold Neth2 for the rotational speed to an Neth2A (second value) (step S16). The stop position control described below is not performed. In the case of an affirmative determination in step S14, the ECU 50 sets the threshold Neth2 to Neth2B (first value) (step S18). The Neth2B is smaller than the Neth2A. Further, the ECU 50 performs a start position control and temporarily opens the throttle valve 40 (step S19).

After step S16 or S19, the ECU 50 determines whether the rotational speed Ne is equal to or higher than the threshold Neth2 (step S20). In the case of a negative determination, the ECU 50 starts the engine 10 with cranking (step S22). In the case of an affirmative determination, the ECU 50 starts the engine 10 without cranking (step S24). After step S22 or S24, the process ends.

According to this embodiment, the ECU 50 starts the engine 10. Air is introduced into the engine 10 for starting the engine 10. While introducing air into the engine 10, the rotational speed decreases. The ECU 50 sets the threshold Neth2 according to the vehicle speed. When the rotational speed Ne is less than the Neth2, the ECU 50 starts the engine 10 by performing cranking (step S22). On the other hand, when the rotational speed Ne is equal to or higher than the Neth2, the ECU 50 starts the engine 10 without cranking. When the rotational speed Ne is as high as the Neth2 or higher, engine stall is unlikely to occur while air is introduced. Thus, it is possible to prevent engine stall and start the engine 10.

When the vehicle speed V is less than a predetermined speed Vth, the ECU 50 sets the threshold Neth2 to the Neth2A (step S16). When the rotational speed Ne is equal to or higher than the Neth2A, the ECU 50 starts the engine 10 without cranking. Due to the high rotational speed, engine stall is unlikely to occur before a sufficient amount of air is introduced for combustion. Therefore, it is possible to start the engine 10 without cranking. When the rotational speed Ne is less than the Neth2A, the ECU 50 cranks and starts the engine 10. Engine stall can be prevented by performing cranking.

When the vehicle speed V is equal to or higher than the Vth, the ECU 50 opens the throttle valve 40 (step S19), such that air is introduced into the engine 10 before the start request. Therefore, a sufficient amount of air for combustion can be quickly secured. In this case, the ECU 50 sets the threshold Neth2 to the Neth2B, which is smaller than the Neth2A. Even when the threshold is set to the Neth2B smaller than the Neth2A, the time until air can be introduced is short, such that engine stall is unlikely to occur. The engine stall can be prevented and the engine 10 can be started without cranking (step S24). When the rotational speed Ne decreases to less than, for example, the Neth2B, cranking may be performed to start the engine 10 (step S22).

In the example described above, the hybrid vehicle 1 is controlled by the single ECU 50. The embodiment is not limited to this, and the above-described control may be executed by a plurality of ECUs such as an engine ECU for controlling the engine 10, a motor ECU for controlling the motor 15, and a clutch ECU for controlling the K0 clutch 14.

The preferred embodiment of the present disclosure is described in detail above. However, the present disclosure is not limited to the specific embodiment, and various modifications and changes can be made within the scope of the gist of the present disclosure described in the claims.

What is claimed is:
1. A control device for a hybrid vehicle that includes an internal combustion engine, a motor, and a clutch provided between the internal combustion engine and the motor, the control device comprising:
a first start control unit configured to start the internal combustion engine by causing the motor to perform cranking;

a second start control unit configured to start the internal combustion engine without causing the motor to perform cranking; and a setting unit configured to set a threshold for a rotational speed of the internal combustion engine according to a vehicle speed of the hybrid vehicle, wherein:

the first start control unit is configured to start the internal combustion engine when the rotational speed of the internal combustion engine is less than the threshold; and the second start control unit is configured to start the internal combustion engine when the rotational speed of the internal combustion engine is equal to or higher than the threshold.

2. The control device according to claim 1, further comprising a throttle control unit configured to control a throttle valve of the internal combustion engine, wherein:

the throttle control unit is configured to open the throttle valve when the vehicle speed of the hybrid vehicle is equal to or higher than a predetermined speed;

the setting unit is configured to set the threshold to a first value when the vehicle speed of the hybrid vehicle is equal to or higher than the predetermined speed; and the setting unit is configured to set the threshold to a second value larger than the first value when the vehicle speed of the hybrid vehicle is less than the predetermined speed.

* * * * *